(12) United States Patent
Christie et al.

(10) Patent No.: US 10,018,309 B2
(45) Date of Patent: Jul. 10, 2018

(54) CONTROL HEAD OF A FLUID MEASURING DEVICE, FLUID MEASURING DEVICE, AND METHOD OF MANUFACTURING A CONTROL HEAD

(71) Applicant: Buerkert Werke GmbH, Ingelfingen (DE)

(72) Inventors: Christopher Christie, Essen (DE); Yannick Fuchs, Logelbach (FR); Volker Haaf, Crailsheim (DE); Bertrand Koenig, Saint Pierre Bois (FR)

(73) Assignee: Buerkert Werke GmbH, Ingelfingen (DE)

( * ) Notice: Subject to any disclaimer, the term of this patent is extended or adjusted under 35 U.S.C. 154(b) by 71 days.

(21) Appl. No.: 14/563,244

(22) Filed: Dec. 8, 2014

(65) Prior Publication Data

US 2015/0159811 A1    Jun. 11, 2015

(30) Foreign Application Priority Data

Dec. 9, 2013   (DE) .................. 10 2013 113 728

(51) Int. Cl.
*F17D 3/01*     (2006.01)
*B21D 26/033*   (2011.01)
(Continued)

(52) U.S. Cl.
CPC ............. *F17D 3/01* (2013.01); *B21D 26/033* (2013.01); *G01D 11/24* (2013.01); *G01F 15/18* (2013.01);
(Continued)

(58) Field of Classification Search
CPC ......... B21D 26/033; F17D 3/01; G01F 15/14; G01F 15/005; G01F 15/18;
(Continued)

(56) References Cited

U.S. PATENT DOCUMENTS 4,663,970 A * 5/1987 Sutherland ............. G01F 15/14
                                                    73/273
5,668,322 A * 9/1997 Broden ............... G01L 19/0015
                                                   137/798
(Continued)

FOREIGN PATENT DOCUMENTS

CN    101778545 A  *  7/2010  ............. G01D 11/24
CN    103052867 A  *  4/2013  ............... G01F 3/10
(Continued)

OTHER PUBLICATIONS

Translation of DE 102007004828.*
(Continued)

*Primary Examiner* — Kevin Murphy
*Assistant Examiner* — Kelsey Cary
(74) *Attorney, Agent, or Firm* — Steve D. Underwood; FisherBroyles LLP (57) ABSTRACT

A fluid control head of a fluid controlling or fluid measuring device has a onepiece outer housing which includes a surrounding shell surface, an open face side formed by a first opening and facing the device, and a lateral bulge having a lateral, more particularly radial opening in the shell surface. The outer housing is a one-piece housing shaped by hydroforming.

18 Claims, 5 Drawing Sheets

(51) Int. Cl.
  *H05K 5/00* (2006.01)
  *G01F 15/18* (2006.01)
  *G01D 11/24* (2006.01)

(52) U.S. Cl.
  CPC ....... *H05K 5/0017* (2013.01); *Y10T 137/6851* (2015.04)

(58) Field of Classification Search
  CPC ........... Y10T 137/6851; H05K 5/0017; G01D 11/24; G01D 11/28
  USPC .......................................... 251/366; 220/676
  See application file for complete search history.

(56) References Cited

U.S. PATENT DOCUMENTS

| | | | | |
|---|---|---|---|---|
| 6,366,436 B1* | 4/2002 | Maier | ..................... | G01F 15/06 361/93.9 |
| 6,588,447 B1* | 7/2003 | Hendey | ................. | G01F 15/007 137/315.06 |
| 7,109,883 B2* | 9/2006 | Trimble | ................. | G01D 11/24 340/870.16 |
| 7,509,970 B2* | 3/2009 | Garcia | ...................... | E03B 9/02 137/272 |
| 7,826,992 B2* | 11/2010 | Skowaisa | ............ | G01F 25/0061 702/104 |
| 8,032,315 B2* | 10/2011 | Richer | ................. | H02K 11/001 702/150 |
| 2006/0122739 A1* | 6/2006 | Fandrey | ............. | G05D 23/1917 700/300 |
| 2010/0089635 A1* | 4/2010 | Hoeland | .............. | H05K 5/0217 174/520 |
| 2011/0291039 A1 | 12/2011 | Wears | | |
| 2012/0031195 A1* | 2/2012 | Skirda | ....................... | G01F 3/10 73/861.08 |
| 2014/0090464 A1* | 4/2014 | Sorenson | .............. | G01F 1/6842 73/273 |

FOREIGN PATENT DOCUMENTS

| | | | | |
|---|---|---|---|---|
| DE | 1548918 | | 10/1969 | |
| DE | 9407812 U1 | | 7/1994 | |
| DE | 19512657 A1 | | 2/1998 | |
| DE | 10126654 A1 * | | 12/2002 | .......... G01F 23/263 |
| DE | 102007004828 A1 | | 8/2008 | |

OTHER PUBLICATIONS

Opposite definition; Printed Oct. 17, 2016.*
Translation of DE 10126654.*
Translation of CN10778545.*
Translation of CN103052867.*
The above references were cited in a German Search Report dated Oct. 6, 2014.

* cited by examiner

CONTROL HEAD OF A FLUID MEASURING DEVICE, FLUID MEASURING DEVICE, AND METHOD OF MANUFACTURING A CONTROL HEAD

FIELD OF THE INVENTION

The present invention relates to a control head of a fluid measuring device, including an outer housing which has a surrounding shell surface. The invention further relates to a fluid measuring device itself, and to a method of manufacturing a control head.

BACKGROUND

In electronically controlled valves or in electronic flow meters, control heads are placed on the respective device to control it or to transfer data from the device. The device onto which the control head is applied is a drive housing of a valve, for example, or the housing of a flow meter through which a flow channel extends. The term "flow measuring device" does also contain a fluid controlling device as a fluid controlling device additionally comprises a valve which is controlled based on the data received from the integrated measuring device. Thus, the present invention also provides a control head of a fluid controlling device and a fluid controlling device.

Control heads made from cast material or from plastic material are known. Further known are outer housings which are welded together from sheet metal parts.

Especially in the pharmaceutical industry and in the food industry, it is important to configure the control heads along with the fluid controlling or fluid measuring devices with the highest level of hygiene possible, so that they are easy to clean.

It is the object of the invention to provide a control head which distinguishes itself by its easy cleanability and can therefore be combined with a valve or flow meters, primarily in the food industry, for example in filling systems.

SUMMARY

The present invention provides a control head of a fluid measuring device, including a one-piece outer housing which has a surrounding shell surface, an open face side formed by a first opening and facing the device, and a lateral bulge having a lateral, more particularly radial opening in the shell surface. The outer housing is a one-piece housing shaped by hydroforming.

The outer housing is made of metal, in particular stainless steel or aluminum or an aluminum alloy.

Outer housings of control heads sometimes have a lateral bulge provided with a large radial opening therein, onto which a display or some other type of cover, for example, may then be optionally placed. The interior of the housing may be accessed via this opening, for example. Such bulges also serve the purpose of providing as flat a surface as possible, which extends perpendicularly to a radial axis. This flat surface then has the large opening realized therein, the rim of which is thus likewise located in this plane. This allows disk-shaped covers or a cover in the form of a display to be placed thereon. In the prior art, the bulges are produced during casting or by welding sheet metal pipes together. At any rate, it is difficult to keep these outer housings clean. Embodiments with welded sheet metal parts have surface irregularities in the areas of the weld seams, which are difficult to keep extremely hygienically clean. Furthermore, in the areas of the welding points, there are transition radii, edges or folds that are so small that, here too, it is with great effort that food residues can be completely removed. Outer housings made from cast material, on the other hand, usually have a rough surface and, moreover, are also relatively heavy.

The idea according to the invention makes provision to provide the housing with the bulge by hydroforming. Hydroforming automatically provides for a smooth outer surface and, in addition, for extremely smooth transition radii in the region of the bulge. These transition radii are relatively large and uniform since, otherwise, the hydroforming process can not be carried out in an optimal manner. Moreover, excessively small radii cannot be realized. As a result, a housing produced by hydroforming offers exactly those properties on its outside which are advantageous for the use in a control head, both in terms of surface roughness and in terms of shape.

In addition to the lateral opening and the open face side facing the device, the control head may also have a second open face side which is opposite to the face side facing the device. The interior of the control head may also be equipped with components through this face side.

The preferred embodiment makes provision that the rim forming the respective opening is so thin that it only corresponds to the wall thickness of the housing.

The second opening and the lateral opening may have substantially identical opening cross-sections; this means that identical covers may be used for closing them.

Except for the bulge, the shell surface has a circular cylindrical geometry, for example; this means that it can be shaped from a tube.

According to one variant, the bulge includes a substantially circumferentially directed wall section having at least one lead-through opening for an energy transmitting line (hydraulics, pneumatics, electrics) which leads into the inside of the housing.

Provision is further made that first and second closure units are fitted to the outer housing so as to be nondestructively releasable, for closing the lateral opening and the second opening.

At least one closure unit may include a blind cover which is preferably made from the same material as the outer housing. The blind cover may have the same external dimensions as the immediately adjacent part of the outer housing, so that the blind cover and the outer housing have, as it were, no steps or shoulders relative to each other on the outside, which is likewise important in order to comply with the hygiene standards.

Further, one or more closure units may also have a cover that is formed by a display. The exterior of the display here is, for example, a smooth, flat glass or plastic material disk, which is likewise very easy to clean.

The display may at the same time have a touch panel, so that any protruding pushbuttons for actuation are avoided.

At least one closure unit may include a cover on the outside and a plastic part, in particular a luminous ring, fitted thereto, by means of which the cover is fastened to the outer housing. The plastic part has integrally molded external geometries, in particular bayonet closure geometries, which constitute a fastening means together with mating geometries on the part of the outer housing. This variant allows to have a cover that is smooth on the outside; it is, for example, not required to press a thread into it from the outside. The plastic part is then fastened to the cover on the inside and thus so as to be protected, so that the closure unit is formed.

A bayonet closure allows to dispense with any protruding fastening means on the outside, such as screws or bolts, for example. Therefore, the outer housing along with the closure unit remains easy to clean.

Inversely, a mounting ring may be fitted to the outer housing at the lateral opening and/or at the first and/or second openings, the closure unit being adapted to be releasably fastened to the mounting ring in order to fasten the closure unit to the outer housing. Here, the mating geometries may be integrally molded with the mounting ring. This also results in that no screws or bolts are visible on the outside and that the outer housing can remain smooth on the outside. This embodiment is especially suitable for hydroforming because no further forming work needs to be performed directly on the outer housing, for example for providing fastening geometries.

The openings have opening rims extending in the shape of a circular ring, the mounting rings being pressed into the outer housing in the region of the opening rims and, as it were, resting against the opening rims.

For easier manufacture and assembly, the mounting rings are of identical configuration. In this way, each mounting ring can be inserted in any of the openings.

The mounting ring of the second opening is bolted to the mounting ring of the first opening by means of a bolted joint which extends in the interior of the outer housing and, therefore, so as to be concealed and protected. In this way, the two mounting rings are axially braced against each other via the bolted joint. The mounting ring of the second opening may thus be nondestructively releasably removed in order to enlarge the cross-section of the second opening for accessing the interior of the outer housing.

The outer housing, along with the closure units fastened to it, is configured without any screws or bolts visible or accessible from outside and therefore has a smooth overall surface.

The one-piece outer housing may also be configured without a weld seam.

The fluid controlling or fluid measuring device according to the invention has a device housing to which the outer housing of the control head according to the invention is fastened. More particularly, a mounting ring inserted in the outer housing is provided at the first opening, the outer housing being fastened to the device housing by the mounting ring; here, too, by means of a bayonet closure, for example.

This means that fastening the device to the control head is also effected without any visible or externally accessible screws or bolts, in order to ensure the smoothness of the overall form on the outside.

The outside diameter of the outer housing in the area of the transition to the device should correspond to the respective connecting area of the device so as to produce a stepless transition here as well.

Finally, the invention also relates to a method of manufacturing a control head according to the invention. A metal tube is reshaped by hydroforming such that a lateral bulge is pushed out from the shell surface of the tube. The lateral opening is then produced in the bulge, the opening being defined, for example, by an opening rim having a thickness that corresponds to the thickness of the metal tube.

The above-mentioned features disclosed in connection with the control head are also applicable to the method.

DETAILED DESCRIPTION

Figure 1:
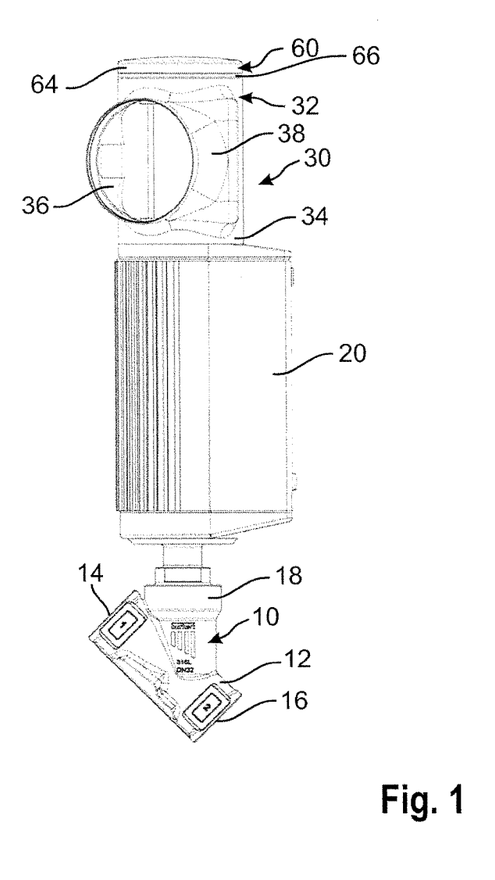
FIG. 1 shows a side view of a fluid controlling device according to the invention with a control head according to the invention.

FIG. 1 illustrates a fluid controlling device in the form of a valve including a valve housing 10 which includes a tubular section having an inlet 14 and an outlet 16 for fluid. A connecting piece 18 receives a valve body which can open or close the fluid connection between the inlet 14 and the outlet 16. The valve plunger is moved by an actuator which is accommodated within a device housing 20. The actuator may be driven hydraulically, pneumatically or electrically.

The valve is controlled by means of a control head 30 which is placed on the actuator on the face side.

The control head 30 contains the open-loop control, closed-loop control and/or measuring electronics for the actuator and, preferably, for the entire valve.

The control head 30 comprises a tubular outer housing 32 which has a surrounding shell surface 34 having a lateral opening 36 formed therein. The opening 36 is part of a lateral bulge 38 of the outer housing 32.

Figure 2:
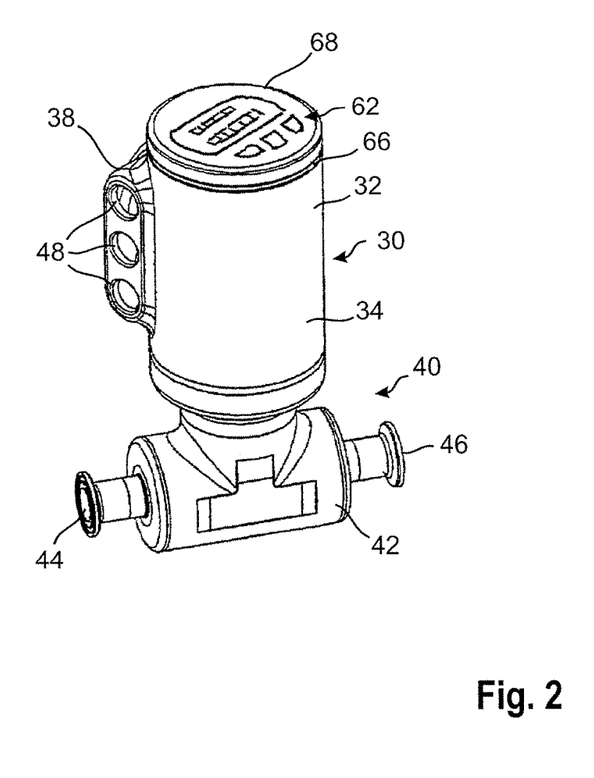
FIG. 2 shows a fluid measuring device according to the invention with the control head according to the invention.

FIG. 2 illustrates a fluid measuring device 40, i.e. a flow meter having a housing 42 which has an inlet 44 and an outlet 46 through which fluid flows. The amount of fluid flowing through the device 40 per unit time is determined. The control head 30 illustrated in FIG. 1 is placed on the housing 42 here, too. The control head 30 here also includes the open-loop control, closed-loop control and/or measuring electronics for the device 40.

The lateral opening 36, which is provided in the outer housing 32 here too, is not visible in FIG. 2 since it faces the rear, that is, it is concealed. But, instead, lateral connecting openings 48 can be seen, which are not visible in FIG. 1, for connecting electric, hydraulic and/or pneumatic components, the openings 48 being formed laterally at the bulge 38, more precisely on a substantially circumferentially directed, e.g. flat wall section 49 of the bulge 38.

The bulge 38 has a tubular section 51 which is perpendicular to the tubular section 53 having the first and second openings on its face sides. The bulge still further has a cylindrical section 55 which adjoins both tubular sections 51, 53 in the transition region and which, in cross-section, has an elongated O-shape that can be seen in conjunction with the flat wall section 49.

Figure 3:
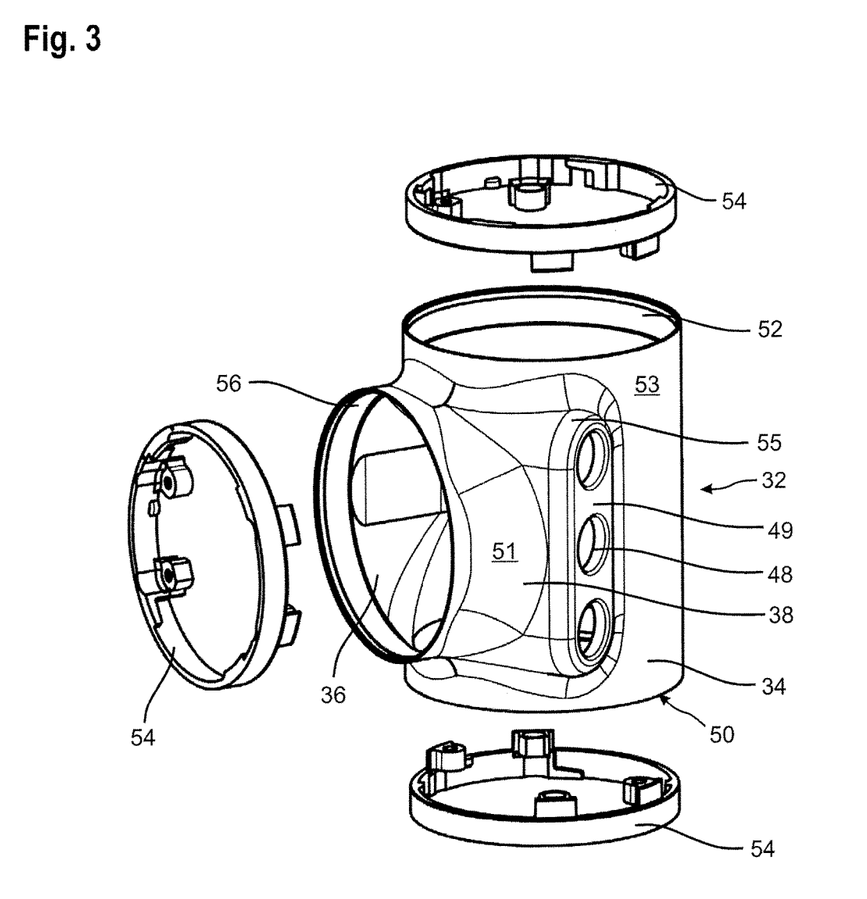
FIG. 3 shows a side view of the outer housing used in the control head according to the invention, with mounting rings.

The outer housing 32 can be seen better in FIG. 3. Except for the bulge 38, the shell surface 34 is cylindrical.

The outer housing 32 has a total of three openings. A first opening 50 defines a completely open lower face side. This opening 50 faces the respective device, that is, the actuator or the housing 42, and is open with respect thereto. The opposite face side of the outer housing 32 is also completely open; the corresponding opening is referred to as second opening 52. It also defines the entire face side. The third opening is the lateral opening 36.

Preferably, three identical mounting rings 54 are provided for locking the adjacent components to the outer housing 32. The mounting ring 54 for the lateral opening 36 and the mounting ring 54 for the first opening 50 are pressed into the respective opening, without any further attachment being required. In this connection it is particularly advantageous if the mounting rings 54 are made of aluminum, which is especially resilient.

The outer housing 32 may be made of steel or aluminum; this should not be understood in a limiting sense.

For an optimum pressing-in process, identically formed opening rims 56 are provided on the lateral opening 36 and on the first opening 50.

Since the mounting rings 54 are identical parts, the openings 50, 52 and 36 are preferably configured to have substantially the same opening cross-sections. Even if the openings 50, 52, 36 slightly deviate from one another, the same opening cross-section will then be obtained at any rate at least for the second opening 52 and the lateral opening 36, based on the identically configured mounting rings 54.

The second opening 52 is also provided with a mounting ring 54 which, however, is not pressed in, but is connected by a fastening means discussed still further below, to allow it to be nondestructively releasably removed. In fact, the entire opening cross-section of the second opening 52 is then available for reaching the interior of the outer housing 32.

The lateral opening 36 and the second opening 52 are closed by two closure units 60, 62 which can be fitted to the outer housing so as to be nondestructively releasable and also are removable again.

The first closure unit is shown in FIG. 1 and comprises a blind cover 64 and a luminous ring 66 fastened to the blind cover and positioned between the blind cover 64 and the outer housing 32.

The second closure unit 62 is shown in FIG. 2 and comprises an electronic display 68 which is formed on the face side of the closure unit 62, and likewise a luminous ring 66. Here, too, the luminous ring 66 is arranged between the display 68 and the outer housing 32.

The two luminous rings 66 are identical parts.

The closure units 60, 62 are exchangeable, i.e. they can selectively close the second opening 52 or the lateral opening 36.

In FIG. 1, the first closure unit 60 is applied to the second opening 52, and the second closure unit will be applied to the lateral opening 36 (in FIG. 1 this has not yet been effected).

In the embodiment according to FIG. 2 it is the other way round; here, the first closure unit is intended to close the lateral opening 36, and the second closure unit 62 closes the second opening 52.

Depending on the installation situation of the device, it can therefore be freely selected whether the display is positioned on the face side or at the side. When the longitudinal axis of the device (center axis of the control head) is arranged vertically, for example, it is advantageous to provide the display 68 at the lateral opening.

When the longitudinal axis of the control head 30 extends vertically, the display 68 will have its optimum fitting position on the upper face side.

Figure 5:
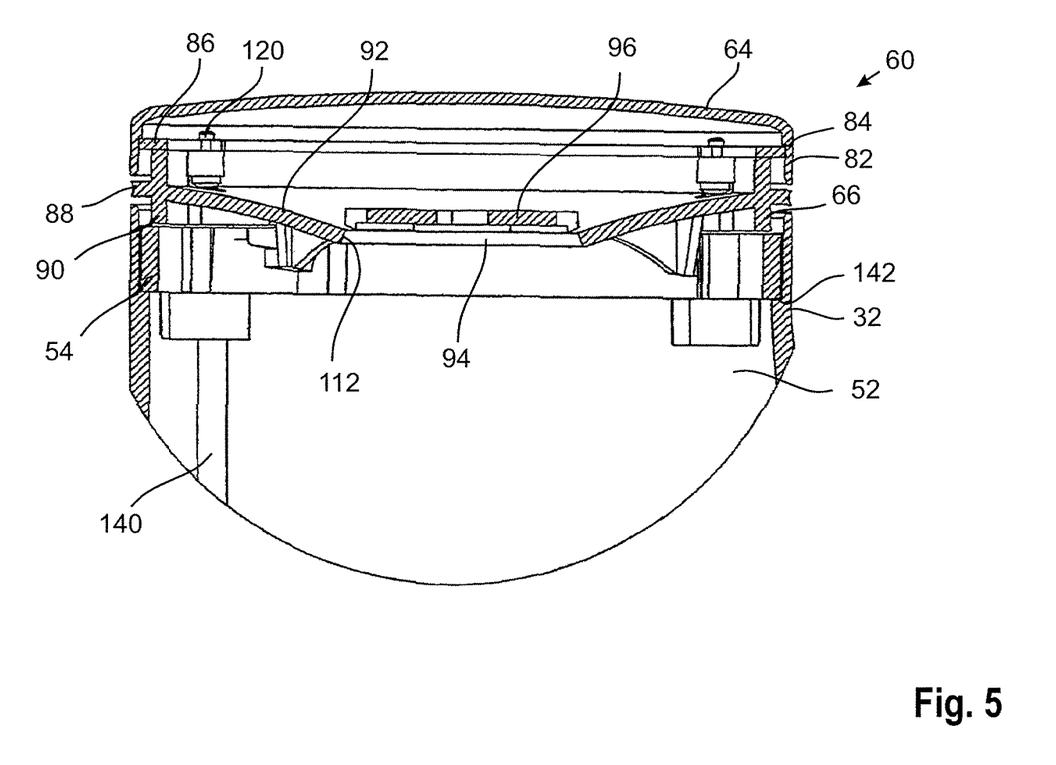
FIG. 5 shows an enlarged cross-sectional view of the control head according to the invention in the region of the upper open face side.
Figure 7:
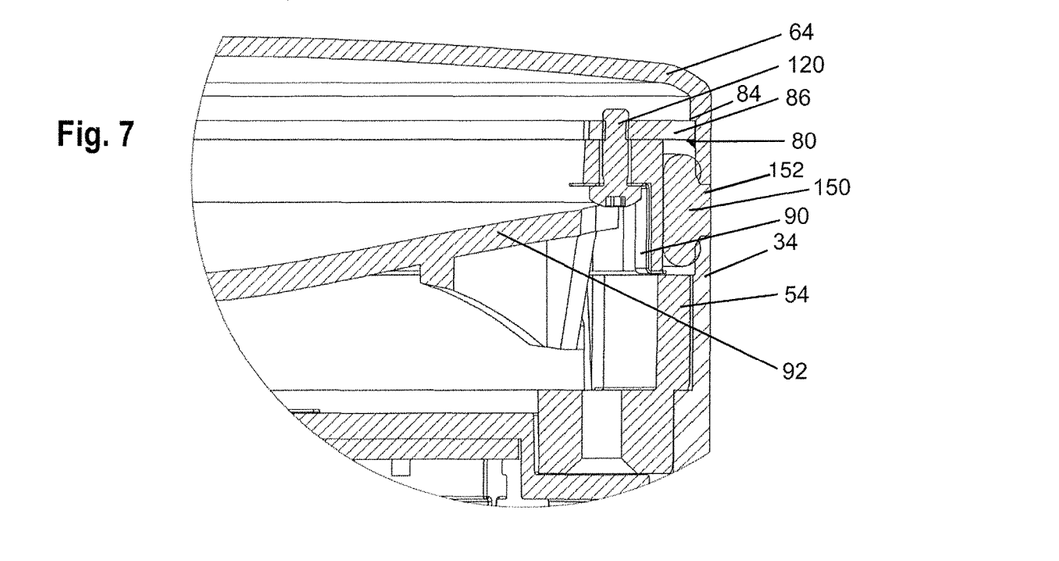
FIG. 7 shows an enlarged view of an edge of the control head according to FIG. 6.

FIG. 5 shows an enlarged cross-sectional view of the first closure unit 60 fitted to the second opening 52 (see FIG. 1). The blind cover 64 has a pot shape and has in its interior a shoulder 84 in the region of its surrounding edge 82, the shoulder 84 having a disk 86 pressed into it which has several recesses and radial projections. The disk 86 is welded to the blind cover 64, for example (see weld seam 80 in FIG. 7) if both parts are made of metal.

Figure 4:
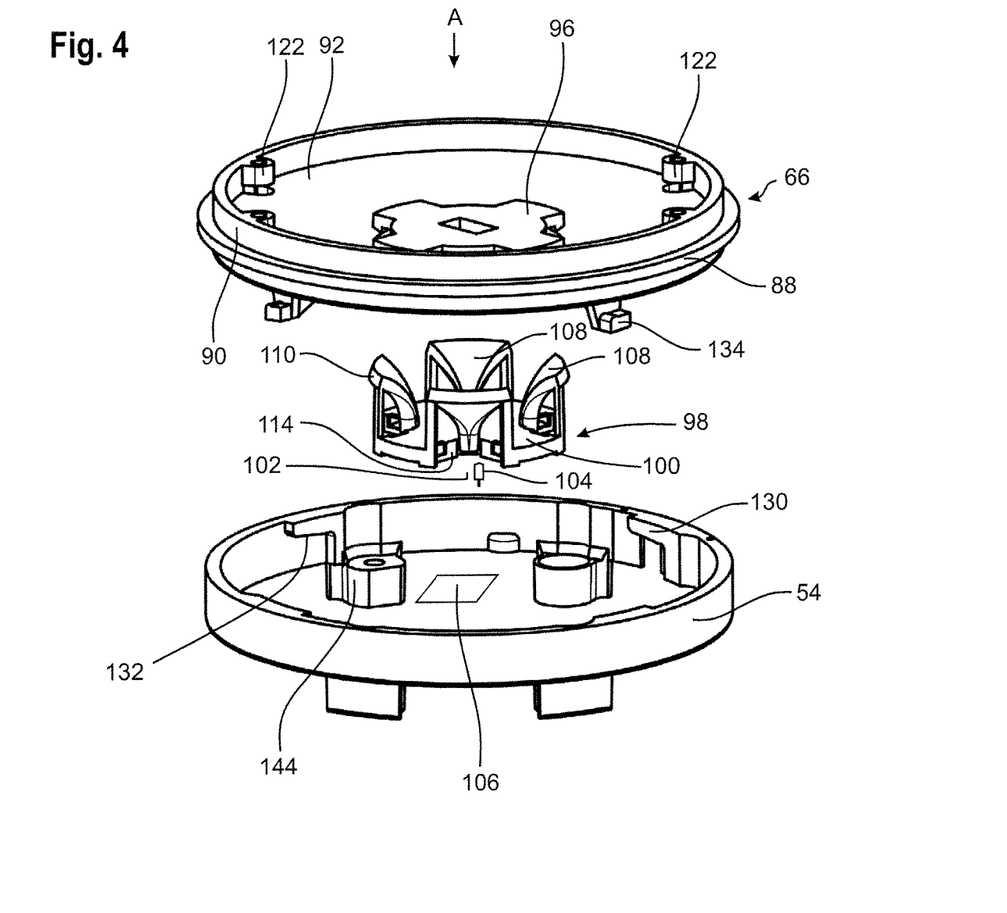
FIG. 4 shows one of the mounting rings shown in FIG. 3, together with a luminous ring and a light distributor.

The luminous ring 66 can be seen well in FIGS. 4 and 5. It has a surrounding, transparent, radially projecting outer ring 88 which transitions in one piece into a tube section 90 which is located radially inwards. The tube section 90 is positioned axially between the disk 86 and the mounting ring 54 and rests against them on both opposite end faces (see FIG. 5).

The luminous ring 66 further has a light-conducting extension 92 which starts from the outer ring 88, protrudes radially inwards and has a disk-shaped design.

As seen in the side view according to FIG. 5, the light-conducting extension 92 runs radially inwards, more specifically in a curved manner towards the inside of the outer housing 32, that is, obliquely away from the blind cover 64.

The luminous ring 66 has a central opening 94 which at the same time constitutes a central opening of the light-conducting extension 92.

A roof-shaped central section 96 is integrally molded with the light-conducting extension 92 over the central opening 94.

A light distributor 98 arranged below the luminous ring 66 protrudes into the central opening 94 (see FIG. 4). But the larger portion of the light distributor 98 is located in the region of the mounting ring 54.

Like the luminous ring 66, the light distributor 98 is injection molded from a transparent plastic material and comprises a base plate 100 which is disk-shaped and has a plurality of recesses 102 into each of which at least one lamp 104, preferably an LED lamp, protrudes which is fastened to a circuit board 106 that is only symbolically shown in FIG. 4. The circuit board 106 is positioned within or below the mounting ring 54, for example. The lamps 104 then protrude upwards into the recesses 102.

Dome segment-shaped light-conducting extensions 108 that are integrally molded with the light distributor 98 extend over the recesses (see FIG. 4).

The upper free ends of the light-conducting extensions have light exit surfaces 110 formed thereon which, in an axial view, have the shape of a circular arc section (see arrow A in FIG. 4).

The light exit surfaces 110 are directly opposite to face side surfaces 112 (FIG. 5) of the light-conducting extension 92 on the luminous ring 66, only a small gap existing between the surfaces.

In the region of the base plate 100, around the respective lamp 104, the light distributor 98 has light entry surfaces 114, so that the light is conducted from the lamp via the light entry surfaces 114 to the corresponding light exit surfaces 110 and then into the luminous ring 66.

The light entry and light exit surfaces 114 and 110 extend at an angle to each other.

The light entry surfaces 114 preferably extend in a plane parallel to the longitudinal axis of the luminous ring 66.

The light exit surfaces 110, on the other hand, extend radially obliquely outwards and, furthermore, are directed slightly to outside the outer housing 32 also axially, as shown by FIGS. 4 and 5.

Since the lamps 104 and the light distributor 98, which has a relatively complicated structure, are always arranged inside the housing 32 in the region of the second opening 52, they are not exchanged when the closure units 60, 62 are removed or exchanged.

With the lamps 104 activated, the luminous ring 66 gives a very uniform light distributed over the circumference, only the outer ring 88 being visible from outside.

As shown in FIG. 5, the outside diameter of the outer ring 88 is somewhat smaller than the outside diameter of the directly adjacent axial end of the blind cover 64. Likewise, the outside diameter of the transparent outer ring 88 is somewhat smaller than the outside diameter of the adjacent end of the outer housing 32, so that the outer ring 88 runs so as to be slightly depressed and to be protected.

Rather than the blind cover 64, the display 68 may also be positioned here, which is also provided on the inside with a corresponding disk 86 which serves to mount the luminous ring 66 both to the display 68 or to the blind cover 64.

The luminous ring 66 is fastened to the disk 86 by way of a plurality of bolts 120, for example, which project through openings in radially inwardly protruding noses 122 on the luminous ring 66 (see FIG. 4). The disk 86 likewise has mating threaded extensions in these areas, so that the bolts 120 are guided through the openings in the noses 122 from below and screwed into the threads on the disk 86. Thereby, the luminous ring is fastened to the blind cover 64 or to the display 68 to constitute a prefabricated unit therewith.

The closure units 60, 62 are fastened to the outer housing 32 by means of a coupling of the luminous ring 66 to the associated mounting ring 54.

In fact, the luminous ring 66 and the mounting ring 54 have integrally molded fastening geometries which come into engagement with each other with an interlocking fit.

In the embodiment illustrated, which should not be understood in a limiting sense, a respective bayonet closure is provided between each mounting ring 54 and the closure units 60, 62.

To this end, the mounting ring includes bayonet closure geometries 130 protruding radially inwards, more specifically preferably four bayonet closure geometries 130 uniformly distributed on the circumference (see FIG. 4).

The bayonet closure geometries 130 here are shoulders which protrude inwards and have obliquely extending wedge surfaces 132 on their lower sides that serve for locking purposes.

The luminous ring 66 has feet 134 projecting radially outwards, more particularly four feet which are uniformly distributed over the circumference.

These four feet 134 engage behind the bayonet geometries 130 and, during insertion by twisting, are pushed along the wedge surfaces 132 axially towards the interior of the outer housing 32, so that a bayonet closure is obtained.

Based on the bayonet closure geometries distributed on the circumference, the display 68 may be inserted in the outer housing 32 in several circumferential positions, more particularly in several steps of 90 degrees. An even larger number of bayonet closure geometries arranged distributed on the circumference allows still smaller steps to be attained.

As can be seen in FIGS. 1 and 2, the outer housing 32 is designed without a screw or bolt accessible from the outside, so that the outer housing 32, along with its closure units 60, 62, is smooth and the entire device, along with the control head, is suitable for use above all in the food industry.

As mentioned above, the mounting ring 54 of the first opening 52 is not pressed into the outer housing 32, but releasably fastened in the outer housing 32. For this purpose, a plurality of long bolts 140 is provided distributed on the circumference. The mounting ring 54 rests against a shoulder 142 on the outer housing 32. The bolts 140 are fitted from above into openings in radially inwardly projecting noses 144 of the mounting ring 54 (see FIG. 4) and extend as far as to the mounting ring 54 of the first opening 50, which either has mating threads provided therein or below which nuts are screwed onto the ends of the bolts 140.

Figure 6:
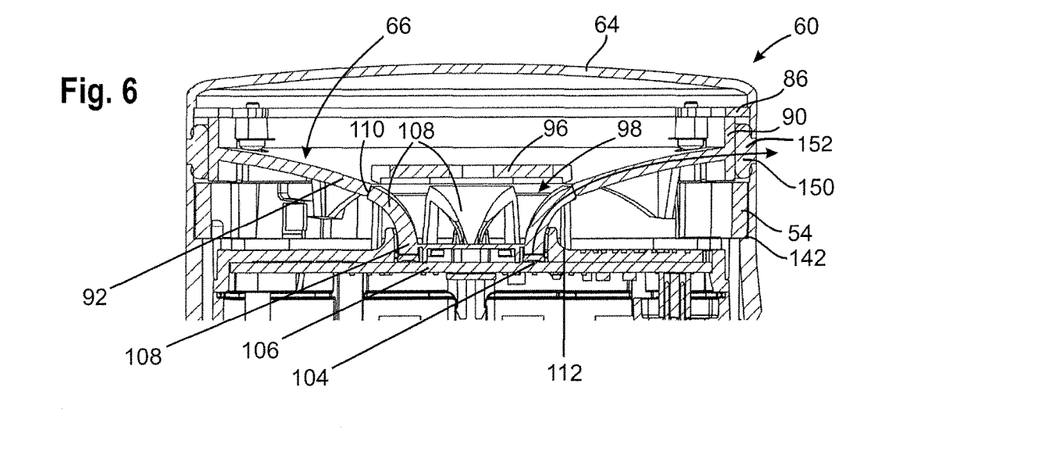
FIG. 6 shows an enlarged cross-sectional view of the further variant of the control head according to the invention in the region of the upper open face side.

Except for a few details, the variant embodiment according to FIG. 6 corresponds to that in the preceding Figures, so that only the differences will be discussed. FIG. 6 further shows some common details of the embodiments in more detail than the above, such as, e.g., the circuit board 106 with the lamp 104 and the coupling of the light distributor 98 to the luminous ring 66.

Unlike in the preceding embodiment according to FIG. 5, in FIG. 6 the outer ring is a separate part which is in the form of a sealing ring 150 and is axially clamped between the cover and the outer housing 32. The sealing ring 150 is transparent and rests against the tube section 90 on the inside over the entire surface. A surrounding bead 152 protruding radially outwards is clamped and conducts the light emitted by the light sources 104 to the outside. The course of light is shown by an arrow in FIG. 6.

Generally, depending on the variant, two blind covers or two displays or one display and one blind cover may be used. When two blind covers are used, an external display may be provided.

Furthermore, a radio transmission unit for data transmission may also be integrated in the control head.

As can be seen in all of the Figures, the outer housing 32, along with the closure units 60, 62 fastened to it, is configured without any screws or bolts visible on the outside and accessible from outside. This preferably also applies to the device housings 20, 42.

The one-piece outer housing 32, which has no weld seams, is produced by hydroforming of a tube, the bulge 38 also being shaped by the forming process, so that a housing 32 is obtained without any edges, weld seams, steps or the like.

The transitions of the individual sections 51, 53, 55 are configured to have large radii and to be harmonious.

The external dimensions of the closure units 60, 62 correspond to those of the adjacent section of the device housing 20 and 42.

The control head housing is releasably fitted to the device housing 20 and 42 without an externally visible threaded joint, preferably also by a bayonet closure.

The invention claimed is:

1. A detachable control head of a fluid measuring device, said control head comprising a one-piece outer housing which has a surrounding shell surface, a first open face side formed by a first opening and facing the device, and a lateral bulge having a lateral radial opening in the shell surface, the outer housing being a one-piece, hydroformed housing,
   wherein the outer housing has a second open face side which is formed by a second opening and is opposite to the first open face side facing the device, said first and second openings centered about a common axis,
   wherein the fluid measuring device is provided on the common axis,
   wherein at least the second opening and the lateral opening have substantially identical diameters and opening cross-sections for being connected to identical covers,
   wherein a mounting ring of the second opening is fastened to/in the outer housing by bolted joints so as to be nondestructively releasable, and
   wherein the outer housing along with closure units fastened to it is configured without any screws or bolts exposed to an exterior of the control head.

2. The control head according to claim 1, wherein the lateral opening in the shell surface is a radial opening.

3. The control head according to claim 1, wherein except for the bulge, the shell surface has a circular cylindrical geometry.

4. The control head according to claim 1, wherein the bulge has a substantially circumferentially directed wall section having at least one lead-through opening for an energy transmitting line which leads into the inside of the housing.

5. The control head according to claim 1, wherein first and second closure units are provided, which are fitted to the outer housing so as to be nondestructively releasable, for closing the lateral opening and the second opening.

6. The control head according to claim 5, wherein at least one closure unit includes a blind cover.

7. The control head according to claim 6, wherein at least one blind cover is made from the same material as the outer housing and/or has the same external dimensions as the immediately adjacent part of the outer housing.

8. The control head according to claim 6, wherein at least one closure unit includes a cover on the outside and a plastic part fitted thereto, by means of which the cover is releasably fastened to the outer housing and which has integrally molded fastening geometries which constitute a fastening means together with mating geometries on the part of the outer housing for releasably fastening the closure unit to the outer housing.

9. The control head according to claim 8, wherein the plastic part is a luminous ring.

10. The control head according to claim 8, wherein the fastening geometries are bayonet closure geometries.

11. The control head according to claim 5, wherein the mounting ring is fitted to the outer housing at the lateral opening and/or at the first and/or second openings, the closure unit being adapted to be releasably fastened to the mounting ring in order to fasten the closure unit to the outer housing.

12. The control head according to claim 11, wherein mating geometries are integrally molded with the mounting ring.

13. The control head according to claim 11, wherein the outer housing has opening rims defining the openings and extending in the shape, of a circular ring, and at least one of the mounting rings being pressed into the outer housing at the opening rim.

14. The control head according to claim 11, wherein the mounting rings are of identical configuration.

15. The control head according to claim 11, wherein the mounting ring of the second opening is bolted to the mounting ring of the first opening by means of a bolted joint which extends in the interior of the outer housing, so that the two mounting rings are axially braced against each other.

16. A fluid measuring device comprising a detachable control head having a one-piece outer housing which has a surrounding shell surface, a first open face, side formed by a first opening and facing the device, and a lateral bulge having a lateral radial opening in the shell surface, the outer housing being a one-piece, hydroformed housing, and comprising a device housing to which the outer housing of the control head is fastened,
   wherein the outer housing has a second open face side which is formed by a second opening and is opposite to the first open face side facing the device, said first and second openings centered about a common axis,
   wherein the fluid measuring device is provided on the common axis,
   wherein at least the second opening and the lateral opening have substantially identical diameters and opening cross-sections for being connected to identical covers,
   wherein a mounting ring of the second opening is fastened to/in the outer housing by bolted joints so as to be nondestructively releasable, and
   wherein the outer housing along with closure units fastened to it is configured without any screws or bolts exposed to an exterior of the control head.

17. The fluid controlling or measuring device according to claim 16, wherein a mounting ring inserted in the outer housing is provided at the first opening, the outer housing being fastened to the device housing by the mounting ring of the first opening.

18. A detachable control head of a fluid measuring device, said control head comprising a one-piece outer housing which has a surrounding shell surface, a first open face side formed by a first opening and facing the device, and a lateral bulge having a lateral radial opening in the shell surface, the outer housing being a one-piece, hydroformed housing,
   wherein the outer housing has a second open face side which is formed by a second opening and is opposite to the first open face side facing the device, said first and second openings centered about a common axis,
   wherein the fluid measuring device is provided on the common axis, and
   wherein at least the second opening and the lateral opening have identical diameters and opening cross-sections for being connected to identical covers.

* * * * *